J. REECE.
VARIABLE SPEED TRANSMITTER.
APPLICATION FILED JAN. 14, 1916.
1,231,647.
Patented July 3, 1917
4 SHEETS—SHEET 4.
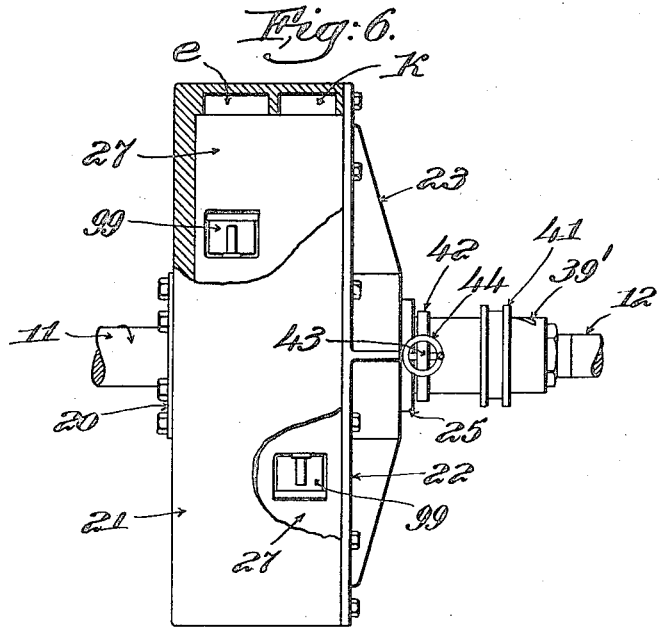
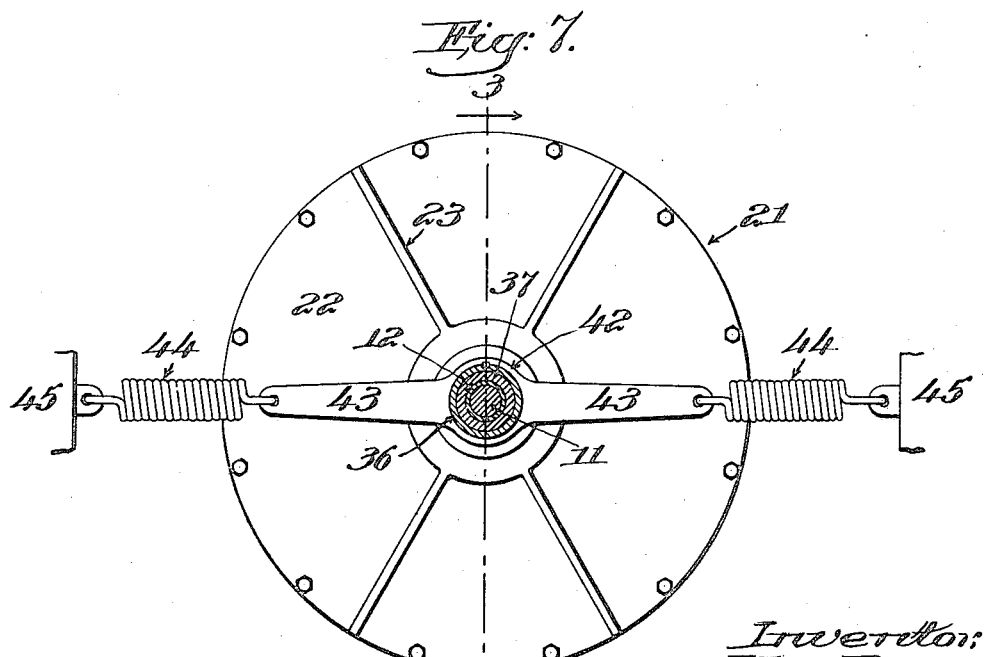
Inventor:
John Reece.
by Rogers, Kennedy
& Campbell,
his Att'ys

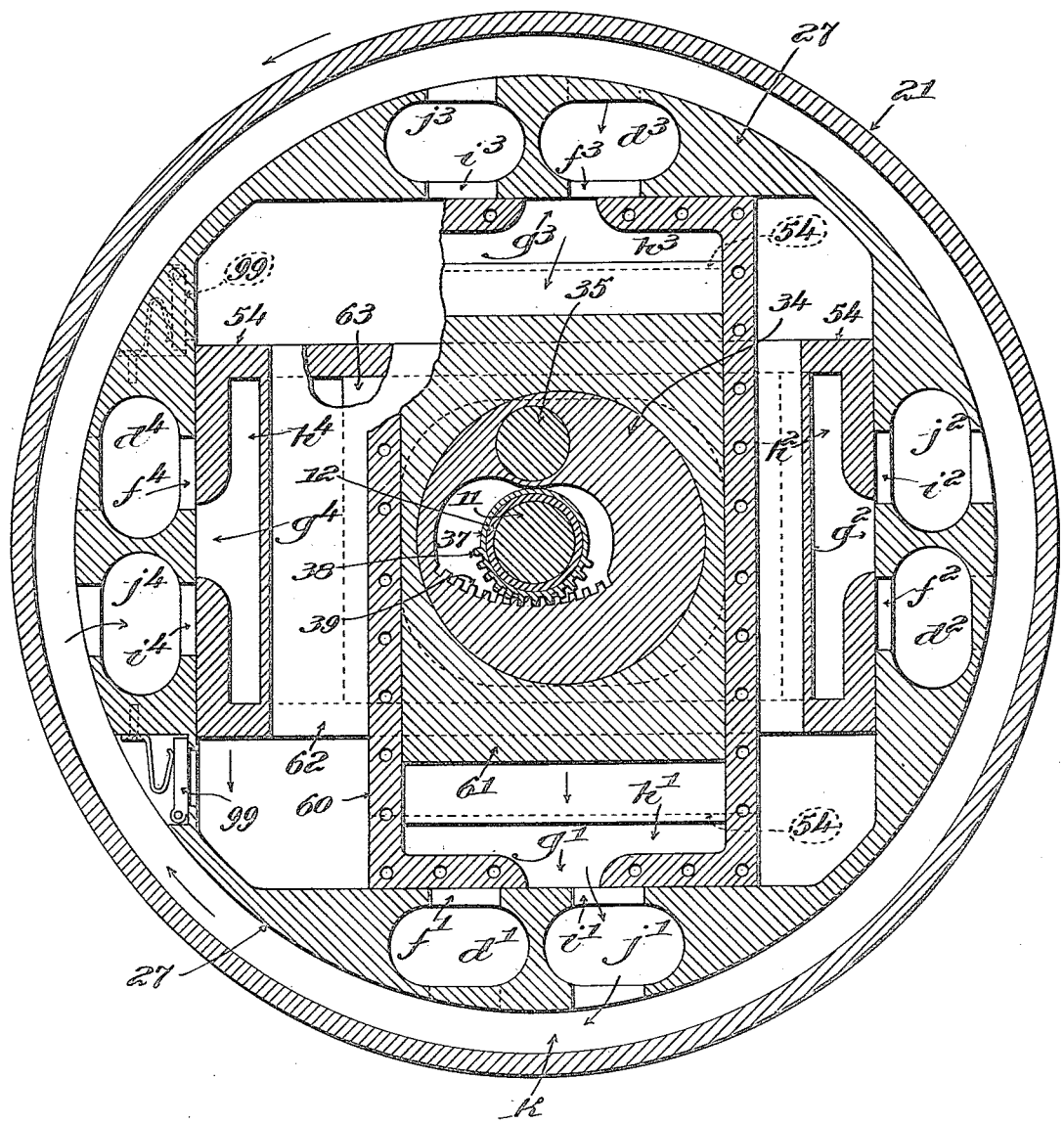

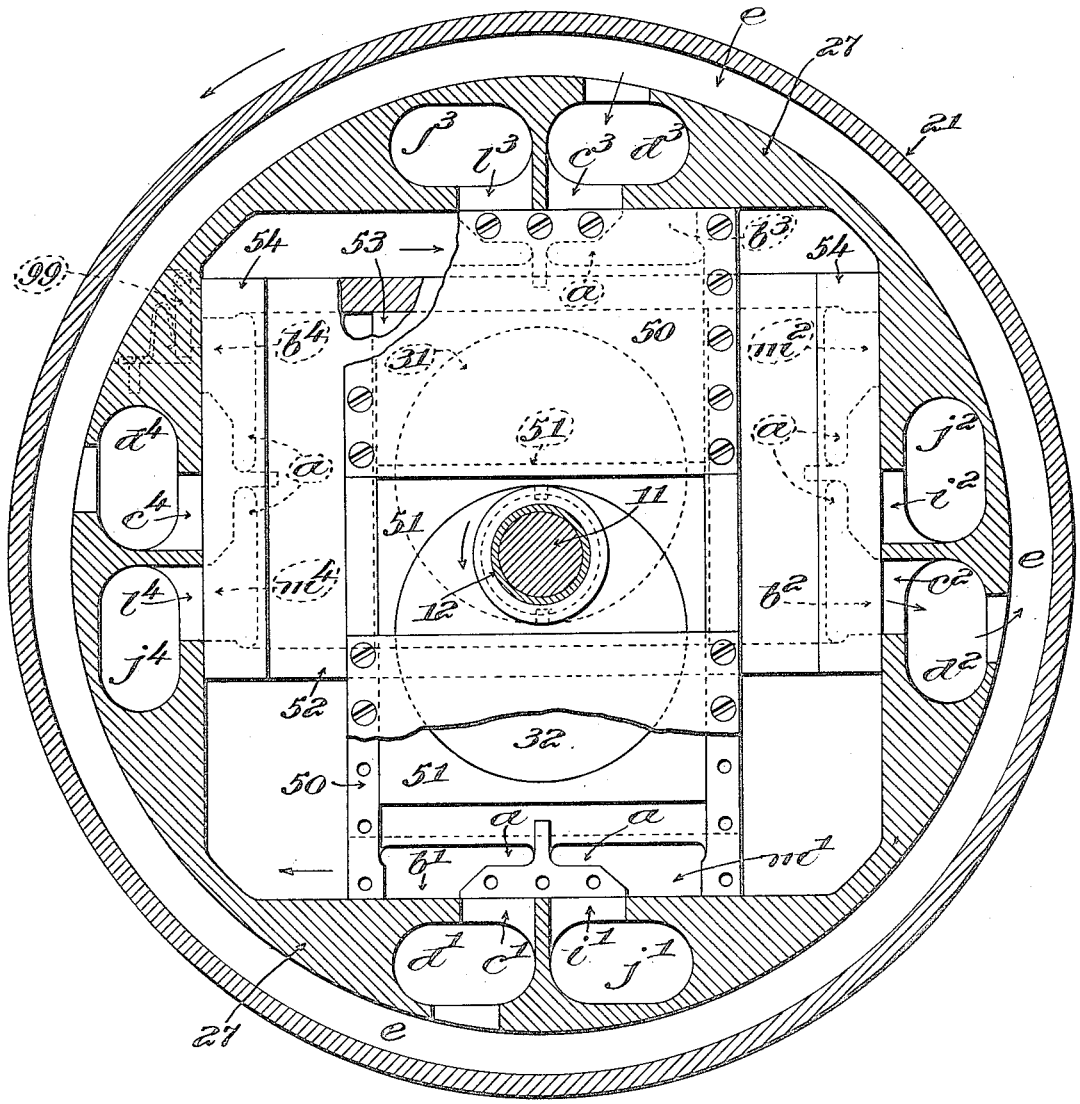

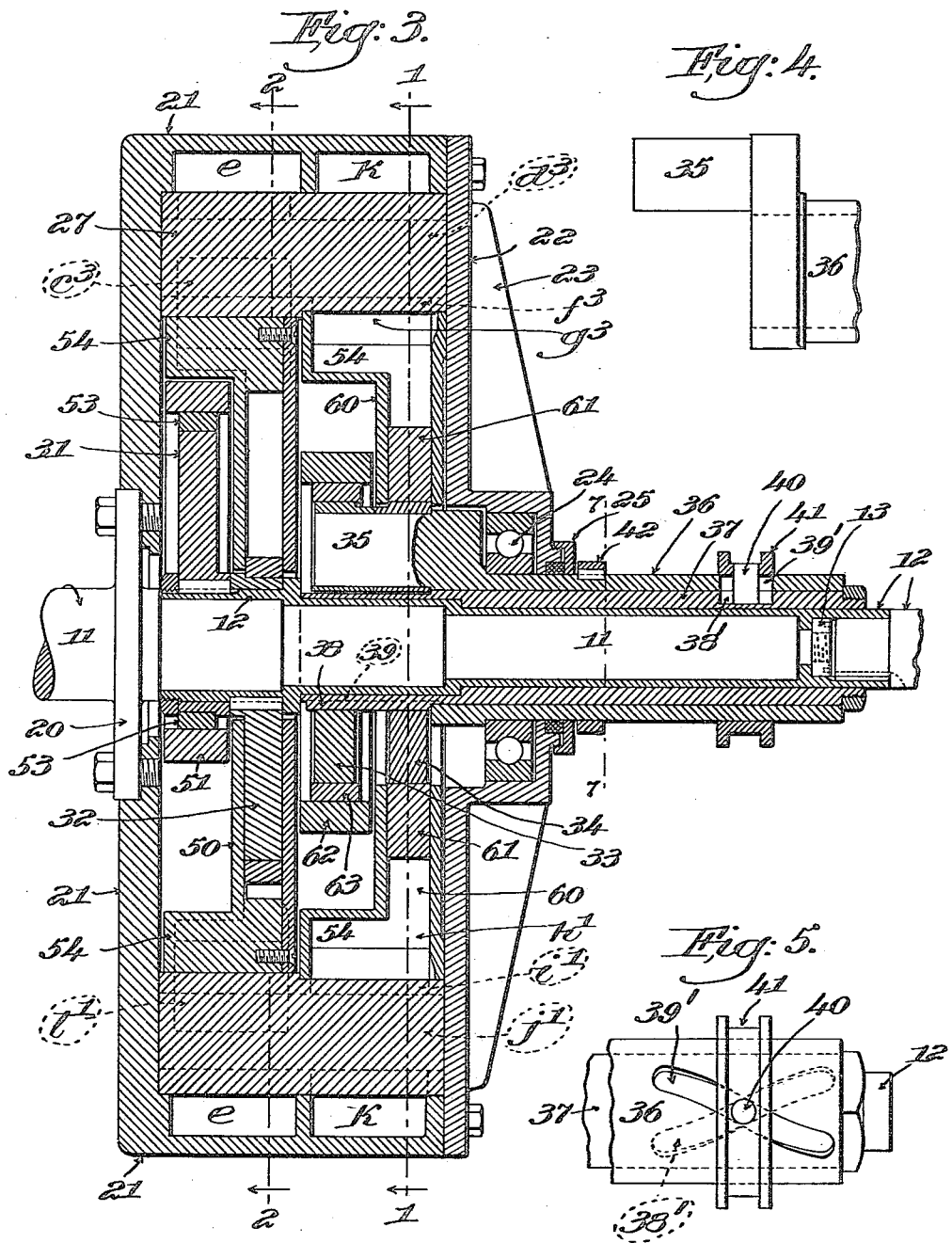

UNITED STATES PATENT OFFICE.

JOHN REECE, OF MANCHESTER, MASSACHUSETTS.

VARIABLE-SPEED TRANSMITTER.

1,231,647.  Specification of Letters Patent.  Patented July 3, 1917.

Application filed January 14, 1916. Serial No. 72,009.

*To all whom it may concern:*

Be it known that I, JOHN REECE, a citizen of the United States, residing at Manchester, in the county of Essex and State of Massachusetts, have invented certain new and useful Improvements in Variable-Speed Transmitters, of which the following is a specification, reference being had therein to the accompanying drawing.
This invention relates to variable speed transmitters, and more particularly to hydraulic mechanism for transmitting the motion of a rotary driving shaft to a rotary driven shaft with provision for varying the speed ratio. The two shafts may, for example, be respectively connected to the engine and to the wheels of a motor vehicle, the mechanism hereof permitting the speed of the vehicle to be controlled.
Generally the object hereof is to afford an improved and simplified variable speed transmitting mechanism possessing good efficiency of transmission, easily adjustable for varying the speed ratio, capable of giving any desired ratio between the extreme limits of adjustment, capable of reversing the driven shaft, and free from the structural weaknesses and other objections of heretofore known mechanisms.
A particular object hereof is to provide a hydraulic transmission wherein the transmitting liquid or oil is caused to flow through the apparatus with a decreasing speed of flow as the ratio of transmission increases, until with a maximum ratio, or one to one, there will be no flow, thereby during the normal running of the apparatus obviating any frictional or other losses due to the flow of the liquid. In the operation of a motor vehicle the direct drive or speed ratio of one to one is used during probably 95% of the normal operation, and the lower speed ratios are usually employed only when starting or when it is necessary to transmit to the driven shaft a greater torque than the driving shaft is capable of giving on direct drive; and, since in any ordinary liquid pumping system there are efficiency losses of from 35% to 45%, it is apparent that a system which pumps its minimum rather than its maximum amount of oil on the direct drive is vastly superior.

I am aware that it has been heretofore attempted to hydraulically transmit power from one shaft to another by means of a system of liquid flow wherein the speed ratio is decreased by the opening of certain ports or valves to permit what is in effect a leakage of the liquid, and thereby a loss of transmitting efficiency. With such apparatuses the lower the speed ratio, the lower will be the torque of the driven shaft, and the maximum torque never exceeds that of the driving shaft. It is another object of this invention to overcome the difficulties of this class of heretofore known apparatuses and to provide a system wherein, when the speed ratio is decreased, there is caused a corresponding increase in torque.

Another object of the present invention is to provide a transmission in which reciprocation of the pistons and the movement of the parts with respect to one another decrease as the speed increases, until, when the ratio of one to one is reached, the entire mechanism is revolving as one unit. This enables very much smaller bearings to be employed and a generally simpler construction, as well as entirely obviating all vibrations during the normal running of the apparatus.

Another particular object hereof is to provide a hydraulic transmission system wherein progressive speed adjustment may be effected over a great range of adjustment, namely, as shown in the present case, from unity to or beyond zero. Another object is to permit such speed adjustments to be made without at any time requiring altering of the timing of valves or ports.

Another object is to permit what may be termed a speed adjustment beyond zero, so as to give a reverse drive, this being accomplished herein by mere excess adjustment involving no reversing of the direction of flow of the hydraulic liquid or altering of valves.

Another object is to provide a resilient means or element in connection with the hydraulic connections of such character as to improve the efficiency and smoothness of operation in a practical manner.

Another object hereof is to provide a hydraulic transmission wherein the entire transmitting mechanism is contained in and rotates with the fly wheel, which is mounted on the driving shaft, thus securing compactness and convenience of structure, and protection to the hydraulic parts. By this arrangement the transmitting mechanism almost entirely displaces the weight of the fly wheel, and thus the additional weight due to the transmitting mechanism is practically nothing.

Another object is to provide a hydraulic transmission in which the velocity of the driven shaft on the highest speed ratio is absolutely uniform without the necessity of employing a separate device to lock the parts and to throw the pumping mechanism out of action.

Further objects will be elucidated in the hereinafter following description.

To the attainment of the above referred to objects the present invention consists in the novel combinations, mechanisms, devices, arrangements and details hereafter referred to or illustrated in the accompanying drawings, which show one embodiment of the present invention.

In the accompanying drawings forming a part hereof, Figure 1 is a cross-sectional view of a variable speed transmitter embodying the present invention, taken on a plane transverse to the driving and driven shafts, this plane being indicated by the broken line 1—1 of Fig. 3.

Fig. 2 is a similar cross-sectional view taken on the crooked line 2—2 of Fig. 3.

Fig. 3 is a central vertical section.

Fig. 4 is a detached view of the crank which supports the non-rotating eccentric hereinafter to be described.

Fig. 5 is a top plan view of certain of the parts shown at the right-hand end of Figs. 3 and 6.

Fig. 6 is a side elevation of the apparatus shown in Figs. 1 to 5, partly broken away to more clearly show certain interior details.

Fig. 7 is a right-hand elevation of the apparatus, partly in section on the plane 7—7 of Fig. 3.

It will be noted in the hereinafter following description and from the accompanying drawings that not only are the operating mechanisms of this invention compactly embodied within the casing of the fly wheel, thus both saving space and giving protection, but the weight of such parts, especially when operating under direct or full speed drive, coöperates with the fly wheel, constituting, in effect, a part of the fly wheel, and thus saving greatly in the amount of dead metal, of which the fly wheel would otherwise be constituted.

Referring to the particular illustration of my invention which is shown in the accompanying drawings, a driving shaft or engine shaft 11 is shown (see particularly Fig. 3), this extending from the left and passing through the transmission apparatus with a succession of shoulders, formed for convenience in fitting it to the driven shaft. The driven shaft 12 is shown as extending from the right toward the left into the transmission apparatus, and the illustrated part of the driven shaft is for the main part hollow with shoulders corresponding to and engaging those of the driving shaft. The right-hand extremity of the driving shaft is shown as having a screw extension which is shouldered and provided with a nut 13, this arrangement tending to secure the driving and driven shafts in proper endwise relation while permitting relative rotation.

I will now describe certain parts, including the outer casing of the transmission apparatus, which are rigid with the driving shaft. This shaft is formed with an integral flange 20, to which is firmly connected by screws what may be termed the fly wheel 21, which is shown in the form of a hollow casting or casing extending outwardly from the flange 20 and then toward the right. The right-hand face of the casing 21 is closed in with a cover or plate 22, which is provided with strengthening webs 23 and is so formed near its middle portion as to accommodate a ball bearing 24 and the usual form of packing device 25.

Also connected with these parts and rotating with the driving shaft is a large cylindrical casting 27, which may be secured in place within the casing 21 by a shrinking process, and this casting, as seen in Figs. 1 and 2, has a generally square-shaped, hollow interior containing the cylinders and pistons and their connected parts, hereinafter to be described.

Before describing the interior mechanism the following general statement of the arrangement of the parts will be of advantage. Referring to Fig. 3, the interior is seen to be generally divided into a forward half at the driving end and a rearward half at the driven end. In the forward half of the casing are arranged a pair of square piston cylinders, and in the rear half are arranged another pair of similar cylinders. The two cylinders contained in the forward half of the casing are seen in Fig. 2, and they stand at right angles to each other. Similarly, the two cylinders in the rear half of the casing are seen in Fig. 1, and they also stand at right angles to each other. All of the four cylinders with their contained pistons, it will be understood, are in a constant state of rotation, turning with the fly wheel or driving shaft. The action of the present mechanism is determined by the control of the movements of the four pistons in the four cylinders. These to-and-fro piston movements are effected by reason of the revolution of the cylinders in conjunction with certain eccentrics. Each cylinder is double-acting, the two forward cylinders constituting one unit which may be considered as either a pump or a motor, while the two rear cylinders constitute another unit which may be considered as either a pump or a motor, depending on the adjustment which is in effect. Generally speaking, there is an inclosed fluid circuit connecting the two units, and, when the cylinder of one unit is tending to draw in oil, that particular cylinder is also in communication through the above mentioned circuit with the cylinder of the other unit, which is tending to drive oil out. In the present device, neither unit is always the pump and neither the motor at zero speed ratio. That is, when the driven shaft is stationary, either unit may be considered as the pump and the other as the motor. At any speed ratio above this, however, that is, when the driven shaft is turning in the same direction as the driving shaft, the forward unit is the pump and the rear unit the motor, while, when the driven shaft turns reversely to the driving shaft, the rear unit is the pump and the forward unit is the motor. This will be more fully explained farther on.

The two pistons at the forward end of the apparatus are shown as coöperating with two eccentrics 31 and 32, which are keyed fast to the driven shaft 12 at 180 degrees from each other. When the driving and driven shafts are turning at the same speed, there is, of course, no relative action of these eccentrics, since, as before stated, the entire interior apparatus turns solidly with the fly wheel. When, however, the driven shaft is turning more slowly than the driving shaft, there is a relative motion between the pistons and eccentrics, and thereby the inward and outward piston movements are effected for the purpose of driving the hydraulic liquid in a manner which will later be more fully described.

The two eccentrics 33 and 34, shown at the rearward end of the casing, coöperate with the two corresponding pistons. These eccentrics 33 and 34 do not revolve with the driven shaft, but are relatively stationary, although adjustable for the purpose of altering their effect, and thereby changing the speed ratio as desired. The eccentrics 33 and 34 are not set at 180 degrees, as with the eccentrics 31 and 32, but the eccentrics 33 and 34 are set in the same relative position. The two eccentrics 33 and 34 are mounted on a stationary stud 35. By this I mean relatively stationary, since a slight resilient motion is permissible for the purpose of equalizing any possible variations in the action of the apparatus. The stud 35, as seen in Figs. 1 and 3, is formed integrally with a sleeve 36, which extends rearwardly within the ball bearing 24 and the packing 25 to an exterior point.

For adjusting the positions of the eccentrics 33 and 34, the following convenient mechanism may be employed. Each eccentric is hollowed out, as seen in Fig. 1, to accommodate the driven shaft.

Surrounding the driven shaft is an adjusting sleeve 37, which is provided with teeth 38 engaging corresponding teeth 39 on each of the two eccentrics. The sleeve 37 extends rearwardly between the sleeve 36 and the driven shaft 12. It will be seen that by slightly turning the sleeve 37, the teeth 38 and 39 will coöperate to cause the swinging of the eccentrics about the stud 35, so as to alter their eccentricity. As seen in Fig. 1, the parts are so arranged that the center of each eccentric may be swung inwardly to coincide with the axis of the driven and driving shafts, in which case the eccentricity would be zero, and incidentally the driving ratio will be unity. As the parts are shown in all figures, the adjustment is such as to give approximately three-quarters of the full driving speed, or a ratio of four to three.

To rotatingly adjust the sleeve 37 for these purposes, it is shown in Figs. 3 and 5 as provided with a helical slot 38' formed directly beneath, so as to intersect, a similar, but oppositely pitched, slot 39' in the stationary sleeve 36. A pin 40 is arranged to enter and engage both slots 38' and 39', and this pin is carried on a grooved collar 41, so that, by sliding the collar endwise, the pin will be moved in the slots, thereby causing the adjusting sleeve 37 to turn and cause the adjustment of the eccentrics 33 and 34. Obviously, grooved collar 41 may be moved endwise by any convenient means, such as a yoked lever controlled manually in any suitable way, for example, similarly to the control of the collar 58 in my prior pending application Serial No. 45,082, filed August 12, 1915.

In order to hold the sleeve 36 relatively stationary, but at the same time to permit a certain slight resilient motion for the purposes already mentioned, it may have keyed to it a ring 42 provided with side extensions or arms 43, 43 attached by stout coil springs 44, 44 to the side frame parts 45, 45, or other members of the vehicle. In practice the cross arms 43, 43, will not retain a steady horizontal position, as shown in Fig. 7, but they will yield somewhat under the strain of the driving action and will assume a position to one side or the other of that shown, in which a slight vibration is permissible without loss of efficiency of the system.

It will be noticed that the quantity of liquid which flows in a given time through the entire system of this invention is determined or limited by the operation of the pistons and cylinders of the rear unit, since it is the rear unit that coöperates with the fixed eccentrics.

When the eccentrics 33 and 34 are adjusted so that there is no eccentricity, the pistons at the rear end of the apparatus are incapable of endwise movement, and, therefore, there will be no flow of liquid. The liquid, as will be later fully explained, goes through varying movements from the forward cylinder system to the rearward cylinder system, and vice versa. Therefore, the adjustment of the eccentrics 33 and 34 into concentricity with the shafts prevents all effective flow of liquid, so that the interior parts become practically consolidated, and a driving ratio of one to one is secured, the driven shaft turning at the same speed as the driving shaft. The eccentrics 33 and 34, on the other hand, may be adjusted into such a position that the rear cylinders have the same displacement as the forward ones, and in this condition or adjustment the action of the driving shaft will simply be to force liquid idly through the system, the driven shaft remaining at zero and giving a zero ratio. If the adjustment of the eccentrics 33 and 34 be carried beyond this point, it results in a cylinder displacement in the rear system in excess of that in front, so that the driven shaft must turn reversely. When a driven shaft speed is desired which is greater than zero, but somewhat less than that of the driving shaft, the parts must have an intermediate adjustment, for example, that indicated in Fig. 1 and other figures.

In this condition the rearward system and the forward system will tend to pump liquid in different quantities per piston stroke, but, as the quantity of liquid forced through the system is constantly uniform, the result is that the eccentrics 31 and 32 and the driven shaft, which carries them, are caused to rotate to counterbalance or offset the differential pumping action referred to. In this way a driven shaft speed between that of the driving shaft and zero is attained.

Bearing in mind that the parts are shown quite well apart in the last mentioned condition or adjustment, the cylinder and piston construction and arrangement will now be described.

Referring to Figs. 2 and 3, the forward pumping unit or system will be seen to comprise a pair of square cross-sectioned cylinders 50 and 52. Within the cylinder 50 is the piston 51 engaged by the eccentric 31, and within the cylinder 52 is the piston 53, engaged by the eccentric 32. The two cylinders and pistons are substantially alike and are arranged at right angles to each other, so as to yield four strokes on each relative rotation. The action of the eccentrics 31 and 32, due to the relative rotation between the driving and driven shafts, is to cause the pistons 53 and 51 respectively to move endwise in their respective cylinders 52 and 50. At the same time the cylinders themselves will move transversely to their lengths respectively, and for this purpose the square interior of the casting 27 is constituted with smooth, flat sides serving as slideways, or surfaces for guiding the cylinders in their backward and forward movements. These cylinder movements are idle, excepting that they are utilized, as hereinafter described, for securing the opening and closing of the ports which control the flow of the liquid. Each of the cylinders at each of its ends is formed with a hollow flange or extension projecting laterally and serving to give a greater sliding surface, and also greater area to the ports to be described. Thus, in Fig. 3 the cylinder 50 is shown as having at its top and bottom ends a leftward extension 54, and similar rightward extensions 54 are seen in Fig. 2 at the opposite ends of the cylinder 52.

The structure of each individual cylinder may be as shown in cross-section. They are oblong to correspond to the pistons. The cylinders are built up, having their face plates screwed into position, as shown. Each cylinder is open at the middle portion of its length so as to accommodate the driving and driven shafts during the forward and backward motion of said cylinder. This construction is possible owing to the great length of the piston 51. In Fig. 2 the piston 51 is shown in its lowermost position, and at its upper edge is seen to overlap the face plate of the cylinder 50. The piston 51 is formed with a circular aperture which receives the eccentric 32, and thereby the endwise piston movements are effected, and at the same time the transverse cylinder movements. The cylinder ports are in the ends of the cylinder. Each cylinder, for example, the cylinder 50, may be considered either as a double-acting cylinder, since it is effective at both ends, or it may be considered as two opposed, single-acting cylinders operated by a single piston 51.

The construction of the cylinder 52 and its contained piston 53 would be substantially similar to that of cylinder 50 and piston 51, and the same is similarly true of the cylinders 60 and 62, and the pistons 61 and 63 at the rear end of the system, (see Figs. 1 and 3). In Fig. 1 the cylinder cover plates are indicated in dotted lines to be cut out further at their inner sides, this being necessary to accommodate the stationary stud 35 before referred to.

Before referring in detail, however, to the flow of the oil through the various ports and passages, it might be advantageous to describe this flow in a general way, and then consider how the liquid is flowing at that very instant of rotation as represented by the drawings, shown especially in Figs. 2 and 3. Referring now to Figs. 1, 2 and 3, it will be noted that the casing 21 is provided with two annular passages or reservoirs, while the casting 27 has eight longitudinal passages. If now we consider these eight longitudinal passages alternately and as representing two separate sets, we will note that one set communicates with one of the annular passages or reservoirs in the casing 21, while the other set likewise communicates with the other reservoir in said casing. In other words, each alternate set of passages is in communication. Referring now to Fig. 1, and considering the ends of the cylinders which, in effect, constitute slide valves, we see that there is a central opening at each end, which may communicate with either one or the other of the sets of longitudinal passages above referred to. Referring to Fig. 2, we note, however, that there are two openings at the ends of each cylinder, one on either side of a central solid portion and likewise communicating with either one or the other of the above mentioned sets of longitudinal passages. If we remember now, that, since the cylinders of both the forward and rear systems or units are carried directly by the fly wheel or driving shaft and that consequently the eccentrics of both the forward and rear systems must turn in the same relative direction with relation to said cylinders, it is apparent that a cylinder of one system, when tending to force oil out, must be in communication with that particular longitudinal passage or that particular set of longitudinal passages from which the cylinder of the other system is tending to draw oil in. As these longitudinal passages and reservoirs only communicate with each other in the manner already described, and not with the interior of the fly wheel, except in the case of two pocket valves to be hereinafter referred to, we have in effect a closed fluid circuit between the two systems.

In describing the ports at the two ends of the four cylinders 50, 52, 60, and 62 and their action, it will be advantageous to at the same time describe the coöperating ports and passages and to set forth the course or direction of flow of liquid. It will be noted in Figs. 1, 2 and 3 that the casing 21 is provided with a couple of annular passages, and that the casting 27 has longitudinal passages, and that these different passages and cylinders communicate with each other by various ports, all of which will now be described, bearing in mind that the illustrated adjustment is one wherein the driven shaft 12 and the eccentrics 31 and 32 carried thereby are rotating in the same direction with, but at a less speed than, the driving shaft.

Referring first to Fig. 2, the driving shaft and the casing parts 21 and 27 are indicated as rotating leftwise. The driven shaft 12 carrying the eccentrics is also indicated as rotating leftwise, but, as its rotation is slower than that of the driving parts, it, relatively speaking, is turning clockwise, and we may, therefore, study Fig. 2 by merely considering the outer parts as stationary and the shaft carrying the eccentrics as rotating clockwise. The cylinder 50 will then be moving leftwise, as indicated. The cylinder 52 is at the top of its throw and about to descend. The piston 51 is at the bottom of its throw and about to ascend, while the piston 53 is traveling at its maximum speed at about the center of its stroke.

At the end of each cylinder 50 and 52 is a space or clearance $a$. When the piston is approaching the end of the cylinder so as to force liquid outwardly, the liquid passes outwardly by ports $b'$, $b^2$, $b^3$ and $b^4$. In Fig. 2 these are all closed with the exception of $b^2$. These ports when operative communicate with ports $c'$, $c^2$, $c^3$ and $c^4$ formed in the casting 27. The ports $c'$, etc., lead to the passages $d'$, $d^2$, $d^3$, $d^4$ formed in the casting 27. These passages $d'$, etc., all lead into the annular reservoir $e$. This annular reservoir or passage $e$ is entirely closed except where the four passages $d'$, etc., communicate with it, as seen in Fig. 2. As seen in this figure, oil is being pumped into the reservoir $e$ through only the ports and passages $b^2$, $c^2$, $d^2$.

The oil is now to be conducted to the rear cylinder system, seen in Fig. 1, and this communication takes place by the oil which is forced into the reservoir $e$, (Fig. 2) entering one of the $d$ passages, namely, $d^3$. This passage $d^3$, like the other $d$ passages, extends longitudinally, and the further course of the liquid must now be followed on Fig. 1, where the same passage $d^3$ is seen in the same position. The oil next passes out of the passage $d^3$ by the ports $f^3$, and thence through the cylinder port $g^3$ into the end or clearance $h^3$ of the cylinder 60. The oil, therefore, forced out of the cylinder 52 by its piston, becomes applied to the top of the piston 61 and the cylinder 60, so as to tend to force the piston downwardly. The movements of the piston 61, however, are absolutely controlled by the fixed eccentric 34. As the parts are adjusted, however, the piston 61 does not move with sufficient speed or action to permit the cylinder 60 to receive all of the oil which the piston 53 is tending to drive out of the cylinder 52. There is, therefore, a sort of reaction between the pistons. The piston 53 is unable to undergo the full speed or movement which the eccentric 31 would cause if stationary. Therefore, as the volume of liquid is unchangeable, the reaction caused by the described pumping action compels the eccentric 31 to yield or turn, thus causing the driven shaft 12 to turn.

As the rotation of the parts continues, the described action of the ports and passages $a$, $b'$, $c'$, $d'$, $e$, $d^3$, $f^3$, $g^3$ and $h^3$ will be repeated at each quarter turn for the respective pistons. Thus, the port $b^3$, $c^3$ is about to open, so that the piston 51, which is about to rise, will commence to pump oil into the passage $d^3$. At the rear end of the apparatus (Fig. 1), the port $f^2$, $g^2$ is about to open, so that a portion of the oil pumped from the forward to the rearward system will commence to enter the cylinder 62, and thereby tend to act upon the piston 63. Thus, as the parts go round and round, the described action continues in rotation.

In the meanwhile a reverse oil flow is taking place, owing to the movement of the pistons 61 and 63 toward the ends of their cylinders. Thus, in Fig. 1, the piston 61 is descending. There is only a single cylinder port $g'$ at each end of the cylinders 60 and 62, which in this respect are unlike the cylinders 50 and 52. The oil forced downwardly by the piston 61 passes from the clearance space $h'$ through the cylinder port $g'$ and through port $i'$ formed in the casting 27, and thence through passage $j'$ into the annular passage or reservoir $k$. From the reservoir $k$ the oil passes into the passage $j^4$ and travels lengthwise or forwardly. Passing now to Fig. 2, the oil thus flowing into the passage $j^4$ is seen to pass out of the same by the port $l^4$, formed in the casting 27, and into the port $m^4$ of the cylinder 52, thus entering the clearance space $a$ in the cylinder at the rear of the piston 53.

The rate at which liquid enters the cylinder 52 at the rear of the piston 53 is exactly equal to the rate at which the piston forces liquid out at the other end of the cylinder.

There is thus a sort of continuous circuit of liquid flow which may be said to commence at the forward end of the system, the liquid being forced outwardly by one or the other, or both, of the pistons 51 and 53, and passing thence through the described passages to the rearward end of the apparatus, where, in conjunction with the interposed pistons 61 and 63, the circuit is continued through the further passages described, and returns to the forward end of the system, thus completing the circuit of movement. The fact that there are practically four piston strokes for each revolution of the driving shaft relatively to the driven shaft insures a substantial uniformity of transmission of energy or impulse. Each of the four piston actions or impulses overlaps the preceding and succeeding one. Any slight divergence from uniformity is efficiently counteracted by the resilient device shown in Fig. 7, heretofore referred to.

As the parts are illustrated in the figures, the power of the driving shaft is transmitted to the driven shaft in a reducing speed ratio. If it be desired to drive the driven shaft at the full speed of the driving shaft, a readjustment is necessary. This may be effected by moving the collar 40 (Figs. 3, 5 and 6) completely to the left or front. This causes the sleeve 37 to turn, and thereby shift through the teeth 38 and 39 to adjust the eccentrics 33 and 34 until their centers coincide with the axis of the shafts. In this condition of the parts, the pistons 51, 53, are necessarily incapable of endwise movement, so that there is no possibility of oil flowing through the rear end of the system. This stops all oil flow, which prevents any movement of the pistons 51, 53 at the forward end of the system. These pistons being relatively stationary, the eccentrics 31 and 32 engaging them are compelled to rotate with the pistons, cylinders and other parts carried by the driving shaft. In other words, the entire system of mechanism is practically locked, and full speed drive is transmitted under the most favorable conditions, with entire absence of any loss of efficiency through friction, leakage or otherwise. The driving and driven shafts are substantially coupled together. Any frictional or other losses, due to the flow of oil, will occur only at the lower speed ratios.

In order to secure a zero ratio, in other words, to bring the driven shaft to rest, the collar 41 will be shifted to the right or rearward, thus turning the sleeve 37 until a point is reached where the eccentricity of the eccentrics 33 and 34 gives a piston throw such as to effect a displacement in each stroke equal to the fixed displacement of the pistons 51 and 53 at the forward end of the system. As a matter of fact, I have shown the pistons 61 and 63 of slightly greater cross-section than pistons 51 and 53, so that a somewhat less throw and eccentricity will give the requisite displacement. When this adjustment is attained, it is obvious that the liquid pumped out from the cylinders 50 and 52 will naturally supply what is needed for the movement of the pistons 61 and 63, so that there is a sort of balance or equalization of liquid flow. Therefore, there is no reaction of the pistons 51 and 53 upon the eccentrics 31 and 32, and the driven shaft is compelled to remain stationary.

As the parts are shown designed in Fig. 1, the eccentrics 33 and 34 may be adjusted beyond the point where the piston displacements are equal at the two ends of the apparatus. When such adjustment is effected, namely, by the extreme rightward or rearward adjustment of the collar 40, the pistons 61 and 63 will possess a greater displacement than the pistons 51 and 53. The necessary consequence is that the eccentrics 31 and 32, and therefore the driving shaft carrying them, are compelled to rotate reversely. It is unnecessary to trace out the exact actions and reactions. The manner and direction of the flow of liquid will be the same as before, but the pushing and pulling actions upon the liquid will be relatively reversed. In other words, in effect, the rear system, or the cylinders 60 and 62, become the pumping elements and the cylinders 50 and 52 the pumped or driven elements.

Oil may be supplied to the described apparatus in any suitable way. I prefer that all the described passages and ports be oil-filled, but the general space within the casting 27 not occupied by the cylinders may be left vacant, or filled partly or entirely with oil, as desired. By maintaining a quantity of oil in the space, it may sometimes be caused to pass into the described oil passages, for example, through the spring-pressed valves 99, which are so arranged that, when a state of suction exists outside the valves and centrifugal force is acting upon the oil at the interior, the valve may open slightly and admit oil to the passages $e$ and $k$.

The following general explanation of the operation of this invention will afford a better understanding of the principles involved.

There are involved two cylinder and piston systems. The forward system or unit is carried by the rotary driving parts or flywheel, and constantly bodily moves around with it. Likewise the rear cylinder and piston system is shown as carried bodily around with the driving parts, although, as will be later explained, a reversal might be made in this respect. Each system may be considered as represented typically by a simple cylinder and piston device, although for smooth and harmonious running a plurality, for example four, cylinders and pistons for each system are preferred. The two cylinder and piston systems are connected by an inclosed liquid circuit of suitable passages, such that one system discharges into the other, and the other in turn discharges into the first. Sometimes one system may be considered as a hydraulic pump and the other a motor, depending on the adjustment. For example, the parts are shown adjusted for forward driving, that is, for rotating the driven parts or shaft in the same direction, but at a less speed than the driving parts or shaft. In this condition the forward system constitutes a pump and the rear system a hydraulic motor. The forward cylinder and piston device is actuated by a crank device, such as an eccentric, secured to and carried around with the driven parts or shaft. The rear cylinder and piston device is also operated by a crank device, but the latter is not carried by the driven parts, but is stationary. The arrangement of the second cylinder and piston device and the coöperating crank device might be reversed and the crank placed on the driving shaft, the cylinder and piston in that case being stationary.

Considering particularly the forward system, it is seen that the pistons are caused to move in their respective cylinders by eccentrics of constant throw carried rigidly on the driven shaft, see Fig. 2. In the rear system, see Fig. 1, the pistons are caused to move by means of two eccentrics held against rotation, and which may, therefore, be termed stationary, although they are adjustable to vary the throw and are capable of slightly resiliently yielding.

The driven parts, of course, oppose rotation, that is to say, they offer resistance or drag to the driving action. In consequence the eccentrics of the forward system, which are keyed to the driven shaft, tend to resist being advanced by the movements of the pistons engaging them. The cylinders, however, which carry the pistons, are constantly rotating with the driving parts. The piston movements resulting from the action of the eccentrics will be of fixed stroke and, therefore, the cylinder displacement and the total quantity of liquid pumped in this system will be uniform per stroke or per revolution of the driving relatively to the driven shaft. Likewise each piston on each withdrawing stroke tends to suck in the same uniform quantity of liquid.

If the hydraulic flow be so controlled or restricted that the forward pumping system is not permitted to deliver and receive liquid freely at the maximum rate, it results that the pumping rate per unit of time and the speed of piston movement are cut down. By reason of this the eccentrics cannot remain stationary, but are compelled to turn and to carry the driven shaft with them to an extent corresponding to the cutting down or restriction of flow. In other words, the driven shaft must speed up so that the difference in the shaft speeds is such as to give a pumping action corresponding with the amount of liquid which the system is permitted to handle.

The rearward cylinder and piston system serves the purpose of controlling or restricting the liquid flow, so that the speed difference or speed ratio of the driving and driven shafts may be controlled. In the rear system the eccentrics do not rotate with the driven shaft or otherwise, but are held against rotation while the corresponding cylinders and pistons rotate with the driving parts. Therefore, the throw of these eccentrics determines the quantity of oil passing through the system, that is, from the front portion to the rear portion of the system, and vice versa. Of course adjustment of the rear eccentrics changes their throw and alters the displacement of the rear cylinders, so as to vary the rate of flow, and in this way control is afforded, which, as explained, permits regulation of the driven shaft speed.

The rear system, having the fixed eccentrics, is the controlling feature. The quantity of oil corresponding to the piston movements therein is the quantity which the forward system may deal with. This is because I have a closed liquid circuit, and the amount of liquid pumped in one direction must equal that flowing reversely.

If the eccentrics of the two systems be adjusted to a corresponding throw, or rear cylinder displacement, there will be a travel of liquid in circuit in a natural way, each system receiving the quantity naturally pumped by the other system, on the assumption that all of the eccentrics in both systems are stationary. This flow is not under pressure, and no rotary movement of the driven shaft or the forward eccentrics is required to compensate for any differential pumping actions. Moreover, as the operations are positive, the forward eccentrics and the driven shaft are held stationary.

Any adjustment of the rear eccentrics, however, to decrease the rear piston throw and displacement will result in a displacement difference which requires the driven shaft to speed up in proportion. This decreases the pumping action of the forward system by lengthening out or slowing out the piston strokes, which continue through a greater extent of angular travel of the driving parts, as compared with the piston strokes in the rear system.

As the throw of the rear eccentrics is decreased more and more toward zero, thus decreasing the stroke and displacement of the rear pistons, the driven shaft must correspondingly speed up more and more toward the speed of the driving shaft. When the rear eccentrics are adjusted to concentricity, the rear pistons have no stroke, their displacement is zero and the period of the stroke of the forward pistons is, so to speak, lengthened out to infinity. In other words, there is no flow or rate of flow, and the forward pistons are substantially locked in their cylinders and the forward eccentrics, therefore, substantially locked in their pistons, carrying the driven shaft with them. With this adjustment I have unity speed ratio or direct drive, the difference in shaft speeds having reduced to zero and the oil having ceased its flow, and serving to substantially lock all of the mechanism rigidly together.

As I look at it, the decrease of eccentricity of the rear eccentrics, resulting in a control or restriction of liquid flow, has the effect that the liquid pumped at pressure from the forward system passes into the cylinders of the rear system and tends to drive forwardly the driving parts. There is no action of leakage or lost motion, but this described hydraulic reaction, tending to advance the driving parts, increases the torque of the latter, the extent of such increase depending upon the eccentricity of the non-rotatable eccentrics and the pressure under which oil is being forced forward into the rear system.

A very advantageous and efficient driving of the driven parts results from the described action.

When the rearward eccentrics have been adjusted to give the same displacement as that of the forward cylinder and piston system, a free liquid flow in circuit ensues, as stated, thus precluding rotation of the driven shaft and the eccentrics carried by it; and, if the rear eccentric eccentricity is increased beyond this amount, it results that the rear system becomes a pump and pumps a greater amount of liquid than the forward system previously tended to handle, so that the driven shaft and the forward eccentrics are compelled to rotate reversely with a speed proportional to the adjustment. In other words, the cylinder and piston action at the forward end is quickened by increasing the speed difference between the two shafts by giving the driven shaft a reverse or minus speed. In this way an effective reverse drive is obtained.

It will thus be seen that I have described a variable speed transmission embodying the principles and attaining the objects and advantages hereinbefore recited. Many matters of arrangement, combination, detail and other features may be varied without departing from the main principles involved, and it is therefore not intended to limit the invention to such features except in so far as specified in the appended claims.

What is claimed is:

1. In a hydraulic variable speed transmitter the combination with the non-rotating part of the apparatus and the driving and driven rotary parts, of a cylinder and piston device carried bodily around with the driving parts and actuated by a crank device carried around with the driven parts, a second cylinder and piston device and a second crank device, one of said devices rotated by or with the driving parts and the other secured to the non-rotating part of the apparatus, passages connecting said two cylinders for flow in both directions; and a resilient element associated with the non-rotating parts for permitting the same to yield under the influence of irregularities in transmission from the driving to the driven parts, thereby harmonizing the action of the apparatus and means for at will adjusting the relative displacement of the cylinders to alter the speed ratio.

2. In a hydraulic variable speed transmitter the combination with the non-rotating part of the apparatus and the driving and driven rotary parts, of a cylinder and piston device carried bodily around with the driving parts and actuated by a crank device carried around with the driven parts, a second cylinder and piston device carried bodily around with the driving parts and actuated by a non-rotating crank device, and passages connecting said two cylinders; and means for adjusting the relative displacement of the cylinders to alter the speed ratio and a resilient element associated with said non-rotating crank device permitting limited yielding thereof during operation for harmonizing the driving actions.

3. In a hydraulic variable speed transmitter the combination with the non-rotating part of the apparatus and the driving and driven rotary parts, of a multiple crank actuated cylinder and piston device between the driving and driven parts, a second multiple crank actuated cylinder and piston device between the rotary and the non-rotating parts of the apparatus, one set of passages connecting all the cylinders of the respective devices; and means for adjusting the displacement of the cylinders of one device relatively to those of the other to alter the speed ratio, said driving and driven parts being axially in alinement, and a resilient element associated with the rotary parts adapted to permit yielding of the non-rotating parts during operation to harmonize the driving action.

In testimony whereof, I have affixed my signature.

JOHN REECE.